(12) United States Patent
Abdel-Rahman

(10) Patent No.: US 12,162,002 B1
(45) Date of Patent: *Dec. 10, 2024

(54) SELECTIVE REDUCTION OF α,β-UNSATURATED KETONE USING ELECTRONICALLY WEAKLY COUPLED 4,4'-DIVINYLAZOARYLENE-BRIDGED DIRUTHENIUM CATALYST BEARING TWO RU(CO)(3-METHOXYPYRIDIN-2-OLATE) ($P^iPR_3$)$_2$ MOIETIES

(71) Applicant: KING FAISAL UNIVERSITY, Al-Ahsa (SA)

(72) Inventor: Obadah Subhi Abdel-Rahman, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 3 days.

This patent is subject to a terminal disclaimer.

(21) Appl. No.: 18/443,965

(22) Filed: Feb. 16, 2024

(51) Int. Cl.
- *B01J 31/20* (2006.01)
- *B01J 31/22* (2006.01)
- *B01J 31/24* (2006.01)
- *B01J 37/02* (2006.01)
- *B01J 37/03* (2006.01)
- *B01J 37/04* (2006.01)
- *B01J 37/06* (2006.01)
- *C07F 15/00* (2006.01)

(52) U.S. Cl.
CPC ........... *B01J 31/2409* (2013.01); *B01J 31/20* (2013.01); *B01J 31/2208* (2013.01); *B01J 31/2291* (2013.01); *B01J 31/2295* (2013.01); *B01J 37/0236* (2013.01); *B01J 37/031* (2013.01); *B01J 37/04* (2013.01); *B01J 37/06* (2013.01); *C07F 15/0046* (2013.01); *B01J 2231/643* (2013.01); *B01J 2531/0205* (2013.01); *B01J 2531/821* (2013.01)

(58) Field of Classification Search
CPC .... C07F 15/0046; B01J 31/2409; B01J 31/20; B01J 31/226; B01J 31/0236; B01J 31/04; B01J 31/06

See application file for complete search history.

(56) References Cited

PUBLICATIONS

Yin, J Organometallic Chem, vol. 690, 2005, 4265-4271. (Year: 2005).*

Jian, et al, "Chemoselective reduction of α,β-unsaturated ketones to allylic alcohols under catalyst-free conditions"; Org. Chem. Front., Sep. 2022, 1109-1114, First published Jan. 5, 2022, DOI https://doi.org/10.1039/D1QO01754C.

Abdel-Rahman, et al.; "1,4-Divinylphenylene-bridged diruthenium complexes with 2-hydroxypyridine- and 2- or 8-hydroxyquinoline-olate ligands"; From the journal Zeitschrift für Naturforschung B https://doi.org/10.1515/znb-2022-0303, Published by De Gruyter Mar. 8, 2023.

Warad, et al.; "New catalysts for the chemoselective reduction of α,β-unsaturated ketones: Synthesis, spectral, structural and DFT characterizations of mixed ruthenium(II) complexes containing 2-ethene-1,3-bis(diphenylphosphino)propane and diamine ligands"; Polyhedron vol. 63, Oct. 31, 2013, pp. 182-188.

Maurer, et al.; "Divinylphenylene-Bridged Diruthenium Complexes Bearing Ru(CO)Cl(PiPr3)2 Entities"; Organometallics 2006, 25, 15, 3701-3712, Publication Date:Jun. 16, 2006 https://doi.org/10.1021/om0602660 Copyright © 2006 American Chemical Society.

Man, et al.; "Spectroscopic and Computational Studies of the Ligand Redox Non-Innocence in Mono- and Binuclear Ruthenium Vinyl Complexes"; Organometallics 2011, 30, 7, 1852-1858 Publication Date: Mar. 10, 2011 https://doi.org/10.1021/om1010534.

Abdel-Rahman, et al.; "Polyelectrochromism and electronic coupling in vinylruthenium-modified carbazoles"; Journal of Organometallic Chemistry, vols. 849-850, Nov. 1, 2017, pp. 98-116, https://doi.org/10.1016/j.jorganchem.2017.05.010.

* cited by examiner

*Primary Examiner* — D Margaret M Seaman
(74) *Attorney, Agent, or Firm* — Nath, Goldberg & Meyer; Joshua B. Goldberg

(57) ABSTRACT

A 4,4'-divinylazoarylene-bridged diruthenium catalyst bearing two Ru(CO)(3-methoxypyridin-2-olate)($P^iPr_3$)$_2$ moieties, its synthesis, and its use as a catalyst.

9 Claims, 4 Drawing Sheets

SELECTIVE REDUCTION OF α,β-UNSATURATED KETONE USING ELECTRONICALLY WEAKLY COUPLED 4,4'-DIVINYLAZOARYLENE-BRIDGED DIRUTHENIUM CATALYST BEARING TWO RU(CO)(3-METHOXYPYRIDIN-2-OLATE)(P$^i$PR$_3$)$_2$ MOIETIES

BACKGROUND

1. Field

The present disclosure relates to the electronically weakly coupled 4,4'-divinylazoarylene-bridged diruthenium catalyst bearing two Ru(CO)(3-methoxypyridin-2-olate)(P$^i$Pr$_3$)$_2$ moieties, its synthesis, and its use as a catalyst.

2. Description of the Related Art

Since the reporting of metal hydrido complexes of the type {[HM(CO)Cl(PR$_3$)$_2$] (M=Ru; Os, R=Ph; Me; cyclohexyl; $^i$Pr)} in the 1960s, considerable interest has been focused on the pivotal catalytic activities of such chemical families towards selective hydrogenation of terminal olefins and alkynes, the coupling of terminal alkynes with carboxylic acid-derived compounds, the dehydrogenation of alcohol to ketones, dialdehydes to lactones, and in particular on regio- and stereospecific insertion of the ruthenium-hydride bond into a terminal —C≡CH bond of the alkyne substrates to form the ruthenium-alkenyl type-families.

More recently, interest in (multi)ruthenium-alkenyl type-complexes has been intensively scrutinized in terms of redox chemistry, electronic coupling, electro switchable poly-electrochromic near infrared (NIR) dyes, tri-, tetra-, and hexametal-organic macrocycles and antiproliferative effects in tumor cell lines.

As these complexes have attracted widespread interest, divinylarylene-bridged diruthenium complexes of the general type [{Ru(CO)(Cl)(P$^i$Pr$_3$)$_2$}$_2$(μ-CH═CH-Ar-CH═CH—)] {Ar=bridging π-conjugated arylene linker} have been investigated and revealed to exhibit two consecutive, chemically and electrochemically, well-behaved, reversible one-electron oxidations at well-accessible potentials. The half-wave redox splitting, $\Delta E = E_{1/2} = E_{1/2}^{+/2+} - E_{1/2}^{0}$, between the two individual redox one-electron oxidations waves depends on the π-conjugated arylene linker "bridge" and can be ranged to be well-separated (strongly coupled) as in the case of five-membered 2,5-N-arylpyrroles- or -furanes- or -thiophenes heterocycles arylene linkers; moderately coupled as in 4,4'-biphenylenes, 2,2'-bipyridines, and many others arylene linkers; or weakly coupled as in the case of the enforced π-stacking of the two phenyl rings in para-[2.2]- or ortho-[2.1]-cyclophanes linkers.

More effective homogeneous metal-organic catalysts are needed in the industrial fields. The catalytic reactivity of the homogeneous metal-organic complex catalysts is influenced by the nature of both the central metal ion and the coordinated backbone ligands. The effect of the central metal ion could be observed in its ability to approach the reacting components to achieve the catalytic processes to the selective productivity. The role of the donor centers of the coordinated backbone ligand could enhance the catalytic efficacy of the metal-organic framework catalysts. Using ruthenium, as central metal ions as dinuclear complex in the metal-organic framework catalysts could improve the catalytic effectiveness of the catalyst by reducing the consumed time and temperature.

SUMMARY

Using ruthenium, as a central metal ion in a dinuclear complex in the metal-organic framework catalysts could improve the catalytic effectiveness of the catalyst by reducing the consumed time and temperature. Accordingly, the present subject matter relates to the chemo-selectivity reduction of α,β-unsaturated ketone, the electrochemical electronic coupling, polyelectrochromic behavior, and spectro(electro)scopic features of 4,4'-divinylazoarylene-bridged bis(ruthenium-alkenyl) moieties terminated via deprotonated chelating, bidentate 3-methoxypyridin-2-olate co-ligand.

According to the present subject matter, a novel 4,4'-divinylazoarylene-bridged diruthenium complex with a general formula [{Ru(CO)(L-κ$^2$[N,O]$^-$)(P$^i$Pr$_3$)$_2$}$_2$(μ-{CH═CH—C$_6$H$_2$-($^i$Pr)$_2$-2,6}$_2$-N═N-4,4')], [Azo2OPy] with κ$^2$[N,O]$^-$-chelating of 3-methoxypyridin-2-olate was successfully prepared. This novel, six-coordinated, octahedral, 18-valence electrons (VEs) type-complex [Azo2OPy] was quantitatively prepared via substituting the two chloro ligands and occupying the vacant coordination sites of the sphere of the five-coordinated precursor complex [{Ru(CO)Cl(P$^i$Pr$_3$)$_2$}$_2$(μ-{CH═CH—C$_6$H$_2$-($^i$Pr)$_2$-2,6}$_2$-N═N-4,4')] by the corresponding deprotonated 3-methoxypyridin-2-olate in a CH$_2$Cl$_2$/MeOH solvent mixture. Complex [Azo2OPy] was routinely characterized in its neutral state by classical NMR, IR, and UV/Vis spectroscopy technique, and in its two reachable oxidized states by IR, UV/Vis/NIR spectroelectrochemistry along with electrochemical techniques.

The results on complex [Azo2OPy] indicate the presence of three isomers with a ratio of 78:20:2 that differ with respect to the orientation of the two κ$^2$[N,O]$^-$-donor atoms of the methoxypyridin-2-olate relative to the CO and alkenyl ligands in the equatorial coordination plane. Electrochemical studies on complex [Azo2OPy] revealed to a single chemically and electrochemically reversible two-electrons oxidation redox wave referring to noteworthy negligible communication between the two remote redox-active endgroups. The results on complex [Azo2OPy] agree with dominant contributions of the π-conjugated divinylazoarylene bridge to the two redox processes and an even delocalization of the electron hole and spin density over the entire π-conjugated divinylazoarylene diruthenium backbone with only minor involvement of the peripherally attached κ$^2$[N,O]$^-$ donor ligands. Complex [Azo2OPy] also shows remarkable chemo-selectivity reduction of α,β-unsaturated ketone giving the corresponding α,β-unsaturated alcohol.

Complex [Azo2OPy], was routinely characterized in its neutral state by classical IR, UV/Vis and NMR spectroscopy technique, and in its two different reachable oxidized states by IR, UV/Vis/NIR spectroelectrochemistry along with electrochemical techniques. Electrochemical studies on complex [Azo2OPy] revealed to a single chemically and electrochemically reversible two-electrons oxidation redox wave. All the electrochemical, IR and UV/Vis/NIR spectro(electro)scopic results on complex [Azo2OPy] confirming our perspectives with dominant contributions of the π-conjugated divinylazoarylene bridge to the two redox processes and an even delocalization of the electron hole and spin density over the entire π-conjugated divinylazoarylene diruthenium backbone with only minor involvement of the peripherally attached κ²[N,O]⁻ donor ligands. Complex [Azo2OPy] shows also strong polyelectrochromic behavior with at least two distinct states with remarkable chemoselectivity reduction of α,β-unsaturated ketone giving the corresponding α,β-unsaturated alcohol.

In an embodiment, the present subject matter relates to a 4,4'-divinylazoarylene-bridged diruthenium catalyst bearing two Ru(CO)(3-methoxypyridin-2-olate)(P$^i$Pr$_3$)$_2$ moieties having the formula I:

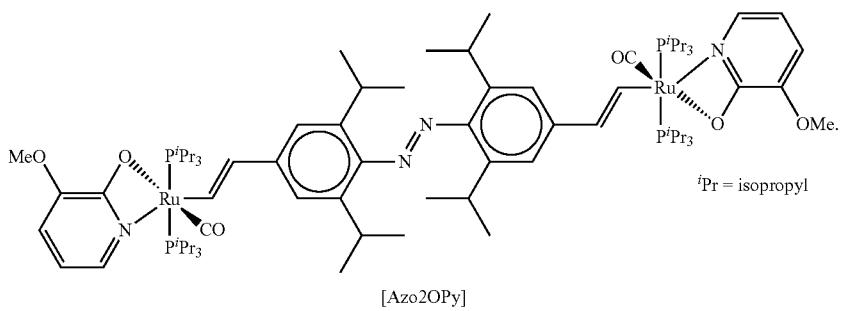
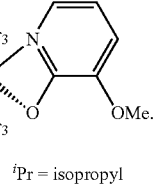

[Azo2OPy]

In another embodiment, the present subject matter relates to a complex that may be a yellow solid.

In a further embodiment, the present subject matter relates to a dinuclear complex that may act as a catalyst.

In an additional embodiment, the present subject matter relates to a method of making the 4,4'-divinylazoarylene-bridged diruthenium catalyst bearing two Ru(CO)(3-methoxypyridin-2-olate)(P$^i$Pr$_3$)$_2$ moieties of claim 1, the method comprising: combining 3-methoxy-2(1H)-pyridone, K$_2$CO$_3$, CH$_2$Cl$_2$, and MeOH to obtain a first reaction mixture; stirring the first reaction mixture for at least about 30 minutes; adding the first reaction mixture to a solution of [{Ru(CO)Cl(P$^i$Pr$_3$)$_2$}$_2$(μ-{CH=CH—C$_6$H$_2$-($^i$Pr)$_2$-2,6}$_2$-N=N-4,4')] in CH$_2$Cl$_2$ to obtain a second reaction mixture; stirring the second reaction mixture to obtain a deep yellow solution; removing the CH$_2$Cl$_2$ and MeOH from the second reaction mixture to obtain a yellow precipitate; washing the yellow precipitate to obtain a residue; drying the residue; and obtaining the 4,4'-divinylazoarylene-bridged diruthenium catalyst bearing two Ru(CO)(3-methoxypyridin-2-olate)(P$^i$Pr$_3$)$_2$ moieties.

These and other features of the present subject matter will become readily apparent upon further review of the following specification.

DETAILED DESCRIPTION OF THE PREFERRED EMBODIMENTS

Figure 1:
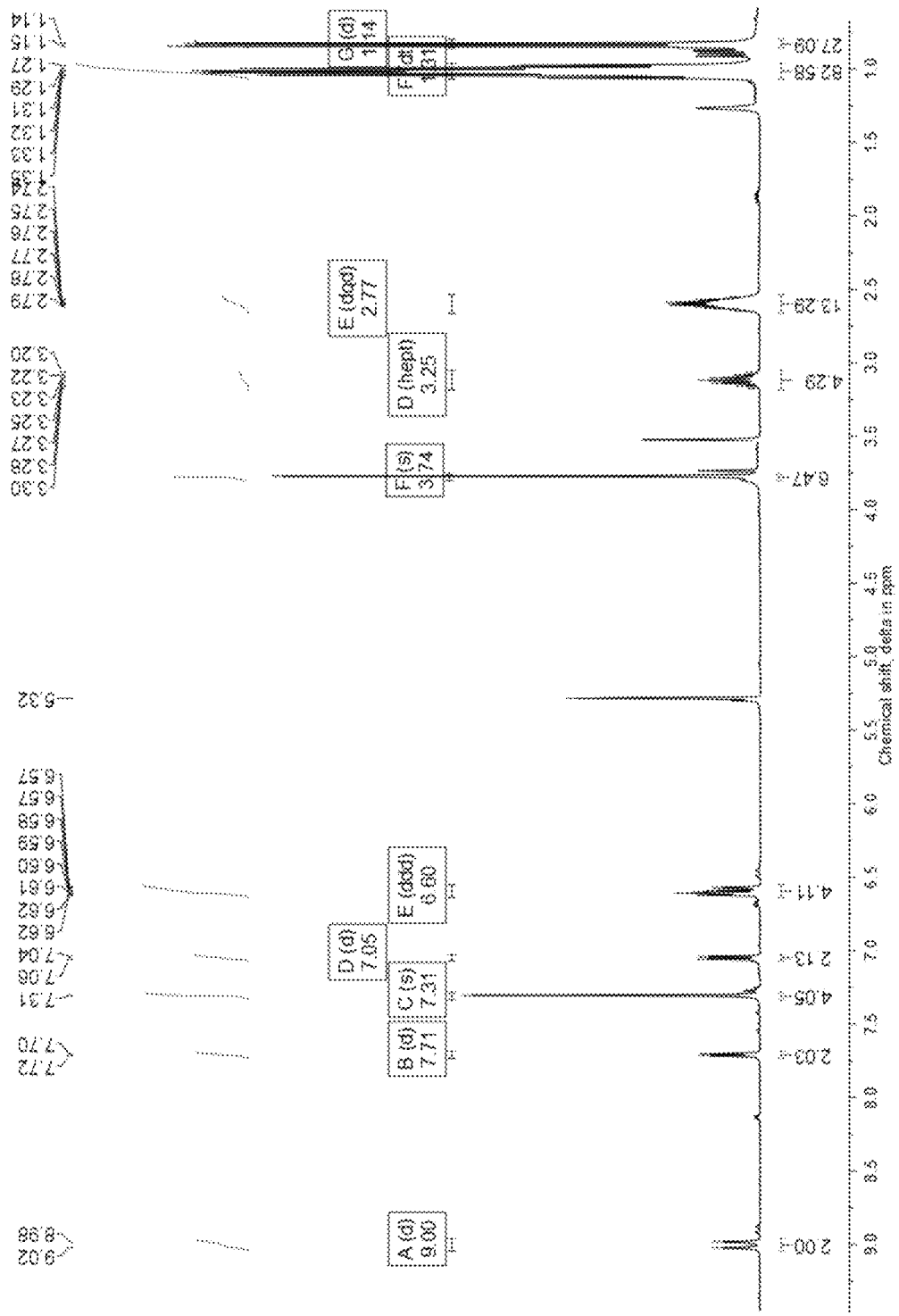
FIG. 1 shows the ¹H-NMR spectrum (400 MHz, CD2Cl2) of complex [Azo2OPy].

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a novel 4,4'-divinylazoarylene-bridged diruthenium complex with a general formula [{Ru(CO)(L-$\kappa^2$[N,O]$^-$)(P$^i$Pr$_3$)$_2$}$_2$($\mu$-{CH=CH—C$_6$H$_2$-($^i$Pr)$_2$-2,6}$_2$-N=N-4,4')], [Azo2OPy] with $\kappa^2$[N,O]$^-$-chelating of 3-methoxypyridin-2-olate. This novel, six-coordinated, octahedral, 18-valence electrons (VEs) type-complex [Azo2OPy] was quantitatively prepared via substituting the two chloro ligands and occupying the vacant coordination sites of the sphere of the five-coordinated precursor complex [{Ru(CO)Cl(P$^i$Pr$_3$)$_2$}$_2$($\mu$-{CH=CH—C$_6$H$_2$-($^i$Pr)$_2$-2,6}$_2$-N=N-4,4')] by the corresponding deprotonated 3-methoxypyridin-2-olate in a CH$_2$Cl$_2$/MeOH solvent mixture. Complex [Azo2OPy] was routinely characterized in its neutral state by classical NMR, IR, and UV/Vis spectroscopy technique, and in its two reachable oxidized states by IR, UV/Vis/NIR spectroelectrochemistry along with electrochemical techniques.

In an embodiment, the present subject matter relates to a 4,4'-divinylazoarylene-bridged diruthenium catalyst bearing two Ru(CO)(3-methoxypyridin-2-olate)(P$^i$Pr$_3$)$_2$ moieties having the formula I:

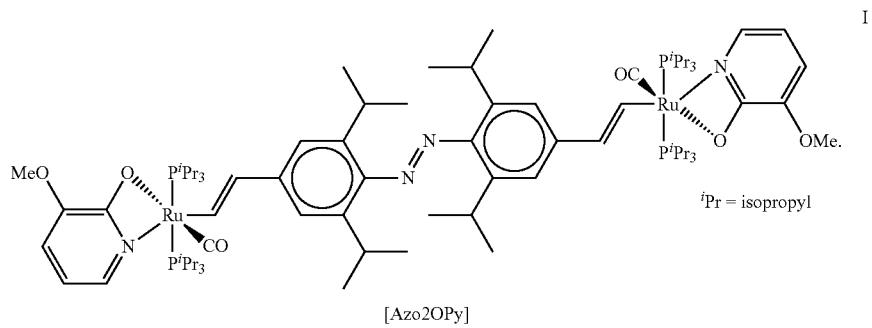

[Azo2OPy]

In certain embodiments, the 4,4'-divinylazoarylene-bridged diruthenium catalyst bearing two Ru(CO)(3-methoxypyridin-2-olate)(P$^i$Pr$_3$)$_2$ moieties can be obtained as a yellow solid.

In another embodiment, the present subject matter relates to a catalyst formed according to the present methods.

In one more embodiment, the present subject matter relates to a method of making the 4,4'-divinylazoarylene-bridged diruthenium catalyst bearing two Ru(CO)(3-methoxypyridin-2-olate)(P$^i$Pr$_3$)$_2$ moieties, the method comprising: combining 3-methoxy-2(1H)-pyridone, K$_2$CO$_3$, CH$_2$Cl$_2$, and MeOH to obtain a first reaction mixture; stirring the first reaction mixture for at least about 30 minutes; adding the first reaction mixture to a solution of [{Ru(CO)Cl(P$^i$Pr$_3$)$_2$}$_2$($\mu$-{CH=CH—C$_6$H$_2$-($^i$Pr)$_2$-2,6}$_2$-N=N-4,4')] in CH$_2$Cl$_2$ to obtain a second reaction mixture; stirring the second reaction mixture to obtain a deep yellow solution; removing the CH$_2$Cl$_2$ and MeOH from the second reaction mixture to obtain a yellow precipitate; washing the yellow precipitate to obtain a residue; drying the residue; and obtaining the 4,4'-divinylazoarylene-bridged diruthenium catalyst bearing two Ru(CO)(3-methoxypyridin-2-olate)(P$^i$Pr$_3$)$_2$ moieties.

In an embodiment of the present production methods, the 3-methoxy-2(1H)-pyridone and K$_2$CO$_3$ may be added in an about 1:1 molar ratio.

In another embodiment of the present production methods, the second reaction mixture may be stirred for at least about one hour.

In still another embodiment of the present production methods, the precipitate can be washed with n-hexane and MeOH. The precipitate may be washed twice.

In a further embodiment of the present production methods, the precipitate can be dried in vacuo.

In an embodiment of the present production methods, the [{Ru(CO)(3-methoxypyridin-2-olate)(P$^i$Pr$_3$)$_2$}$_2$($\mu$-

{CH═CH—C$_6$H$_2$-($^i$Pr)$_2$-2,6}$_2$-N═N-4,4')], 3-methoxy-2(1H)-pyridone, and K$_2$CO$_3$ may be added in an about 0.3:1.1:1.1 molar ratio.

In another embodiment of the present production methods, the 4,4'-divinylazoarylene-bridged diruthenium catalyst bearing two Ru(CO)(3-methoxypyridin-2-olate)(P$^i$Pr$_3$)$_2$ moieties can be obtained as a yellow solid.

In an additional embodiment of the present production methods, the 4,4'-divinylazoarylene-bridged diruthenium catalyst bearing two Ru(CO)(3-methoxypyridin-2-olate)(P$^i$Pr$_3$)$_2$ can be obtained in an about 93% yield.

The following examples relate to various methods of manufacturing the specific compounds and application of the same, as described herein. All compound numbers expressed herein are with reference to the synthetic pathway figures shown above.

EXAMPLES

Example 1

Preparation of [{Ru(CO)(3-methoxypyridin-2-olate)(P$^i$Pr3)2}2(μ-{CH═CH—C6H2-($^i$Pr)2-2,6}2-N═N-4,4')], [Azo2OPy] complex 3-Methoxy-2(1H)-pyridone (0.7 mmol, 88 mg, 2.3 eq.) and equimolar amounts of K$_2$CO$_3$ (97 mg, 0.7 mmol, 2.3 eq.) were stirred at room temperature in a solvent mixture of 7 mL of CH$_2$Cl$_2$ and 7 mL of MeOH for 30 min. This solution was slowly added via a cannula to a solution of 415 mg (0.3 mmol, 1 eq.) of the complex [{Ru(CO)Cl(P$^i$Pr$_3$)$_2$}$_2$(μ-{CH═CH—C$_6$H$_2$-($^i$Pr)$_2$-2,6}$_2$-N═N-4,4')] in 7 mL of CH$_2$Cl$_2$. After complete addition, stirring was continued for one further hour at room temperature to give a deep yellow solution. The solvents were removed under reduced pressure and the yellow precipitate was washed twice with 10 ml of n-hexane and 10 ml of MeOH each to remove the excess starting material and the formed KCl. The resulting residue was then dried in vacuum. [0046] 0.7 mmol of 3-methoxy-2(1H)-pyridone yielded 430 mg (0.28 mmol, 93%) of complex [Azo2OPy].

Figure 2:
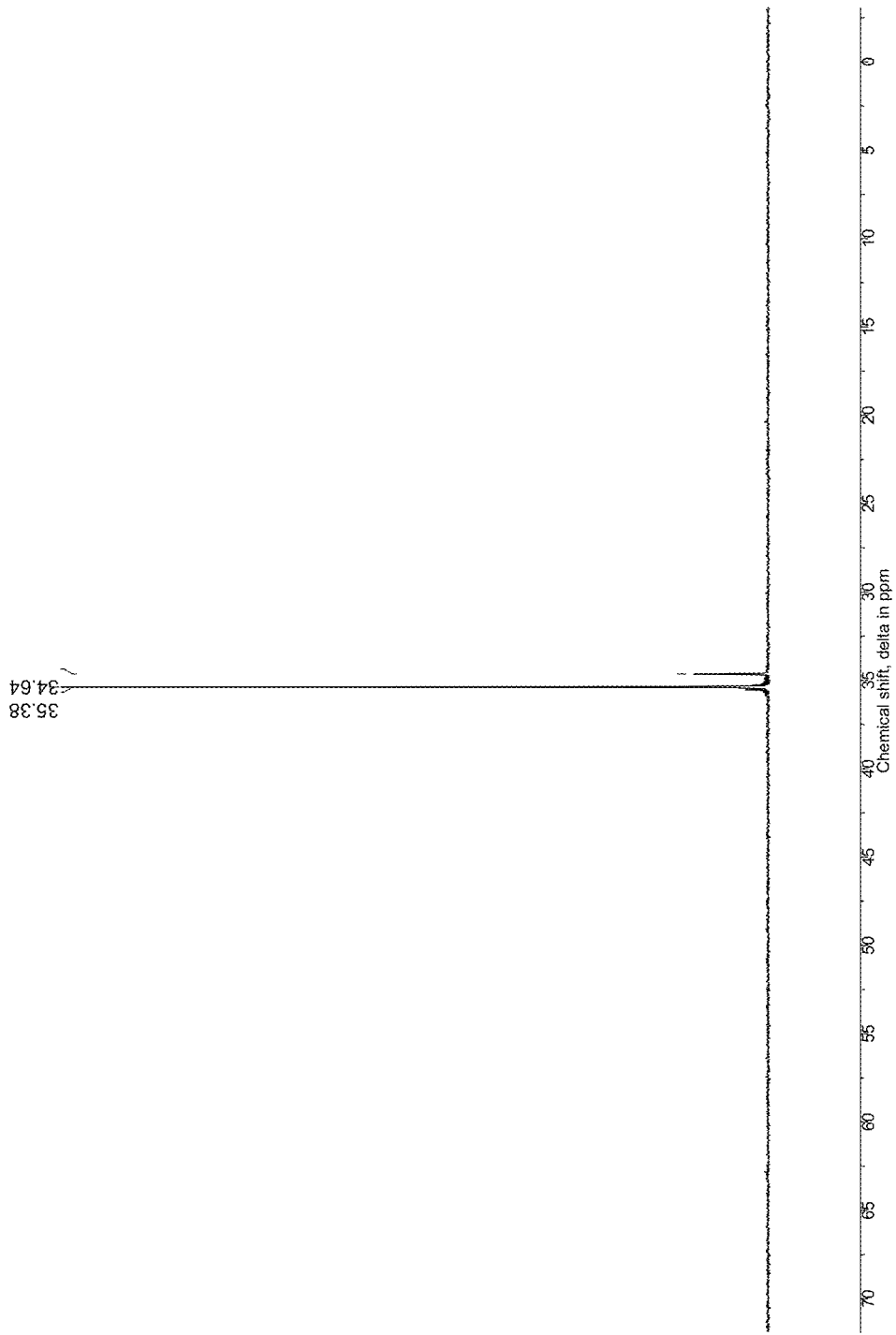
FIG. 2 shows the ³¹P-NMR spectrum (162 MHz, CD$_2$Cl$_2$) of complex [Azo2OPy].

Elemental analysis calcd. for C$_{76}$H$_{132}$N$_4$O$_6$P$_4$Ru$_2$: C: 59.90; H: 8.73; N: 3.68. Found C: 60.02%; H: 8.62%; N: 3.62%. UV-Vis ($\lambda_{max}$ (nm), ε (M$^{-1}$·cm$^{-1}$)): 249 (3.3·10$^4$), 277 (3.8·10$^4$), 399 (3.4·10$^4$), 505 (1.8·10$^4$). IR (ATR, τ in cm$^{-1}$): 2965, 2923 (C—H aryl, vinyl); 1898 (C≡O); 1590, 1565, 1475 (C═C aryl, vinyl); 1585 (C═N); 1530 (N═N). $^1$H-NMR as depicted in FIG. 1 (400 MHz, CD$_2$Cl$_2$): δ: 9.00 (d, 2H, $^3J_{H(1)-H(2)}$=16.2 Hz, H(l)), 7.71 (d, 2H, $^3J_{H(4)-H(5)}$=5.2 Hz, H$_{(4)}$), 7.31 (s, 4H, H$_{(3)}$), 7.05 (d, 2H, $^3J_{H(6)-H(5)}$=6.8 Hz, H$_{(6)}$), 6.62 (vt, 2H, $^3J_{H(5)-H(4)}$=5.2 Hz, $^3J_{H(5)-H(6)}$=6.8 Hz, H(s)), 6.59 (dt, 2H, $^3J_{H(2)-H(1)}$=16.2 Hz, $^4J_{H(2)-P}$=1.7 Hz, H$_{(2)}$), 3.74 (s, 6H, OMe), 3.25 (hept, 4H, $^3J$=6.7 Hz, CH(CH$_3$)$_2$), 2.77 (m, 12H, CHP(CH$_3$)$_2$), 1.31 (m, 72H, (CH$_3$)$_2$PCH), 1.14 (d, 24H, $^3J$=6.7 Hz, (CH$_3$)$_2$CH) ppm. $^{31}$P-NMR as depicted in FIG. 2 (162 MHz, CD$_2$Cl$_2$): major isomer δ: 35.38 (s, P Pr$_3$) and minor isomer δ: 34.64 (s, P$^i$Pr$_3$).

Example 2

Catalytic Activity of the Hydrogenation of α,β-Unsaturated Ketone 0.02 mmol of the [Azo2OPy] complex, 2.0 mmol of trans-4-phenyl-3-butene-2-one, 0.2 mmol of KOH as a co-catalyst in 15 mL of isopropanol were placed in a 50 mL Schlenk flask. The reaction mixture was stirred well for 10 min and degassed by three freeze-thaw cycles and then pressurized with H$_2$ gas at 3.5 bars. The reaction mixture was continually stirred at 30° C. for 2 hr. During the hydrogenation process, samples were frequently taken from the reaction mixture after the H$_2$ gas was removed to determine the conversion percent and hence the turnover frequencies (TOFs). The samples were inserted into a gas chromatograph using a special syringe and compared with the authentic substrate sample.

Trans-4-phenyl-3-butene-2-one was used as an α,β-unsaturated ketone substrate to investigate the hydrogenation catalytic activity of complex [Azo2OPy]. Three different possible hydrogenation products could be obtained. The most favorable selective hydrogenation of the C═O group gives the corresponding α,β-unsaturated alcohol. Hydrogenation of the C═C bond affords a saturated ketone while fully hydrogenation of both the C═O and C═C groups affords the less favorable a saturated alcohol. The hydrogenation process using complex [Azo2OPy] as a catalyst in the presence of excess H$_2$ gas and a strong base, KOH as a co-catalyst in isopropanol as a solvent yielded selective hydrogenation of the C═O group with more than 99% of the corresponding α,β-unsaturated alcohol product after about 20 mins as depicted in Scheme 1. Reduction of the C═C or both C═C and C═O bonds on other hand, was not detected at all.

Scheme 1

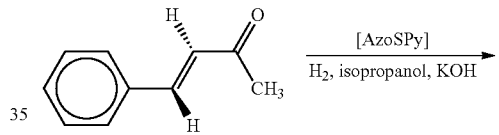

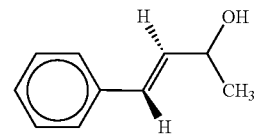

Example 3

Synthesis and NMR Characterization

To investigate the electrochemical electronic coupling, polyelectrochromic behavior, and spectro(electro)scopic features of bis(ruthenium-alkenyl) moieties incorporated into 4,4'-azoarylene bridge linker and terminated with deprotonated, 3-methoxypyridin-2-olate as monoanionic, chelating, bidentate co-ligands, we have successfully prepared a novel [{Ru(CO)(3-methoxypyridin-2-olate)(P$^i$Pr$_3$)$_2$}$_2$(μ-{CH═CH—C$_6$H$_2$-($^i$Pr)$_2$-2,6}$_2$-N═N-4,4')], [Azo2OPy] complex, where the two ruthenium-vinyl end-groups are incorporated into the two para-positions on the azoarylene while the electron-richness of the ortho-positions are equipped by four bulky $^i$Pr groups as depicted in Scheme 2.

Scheme 2

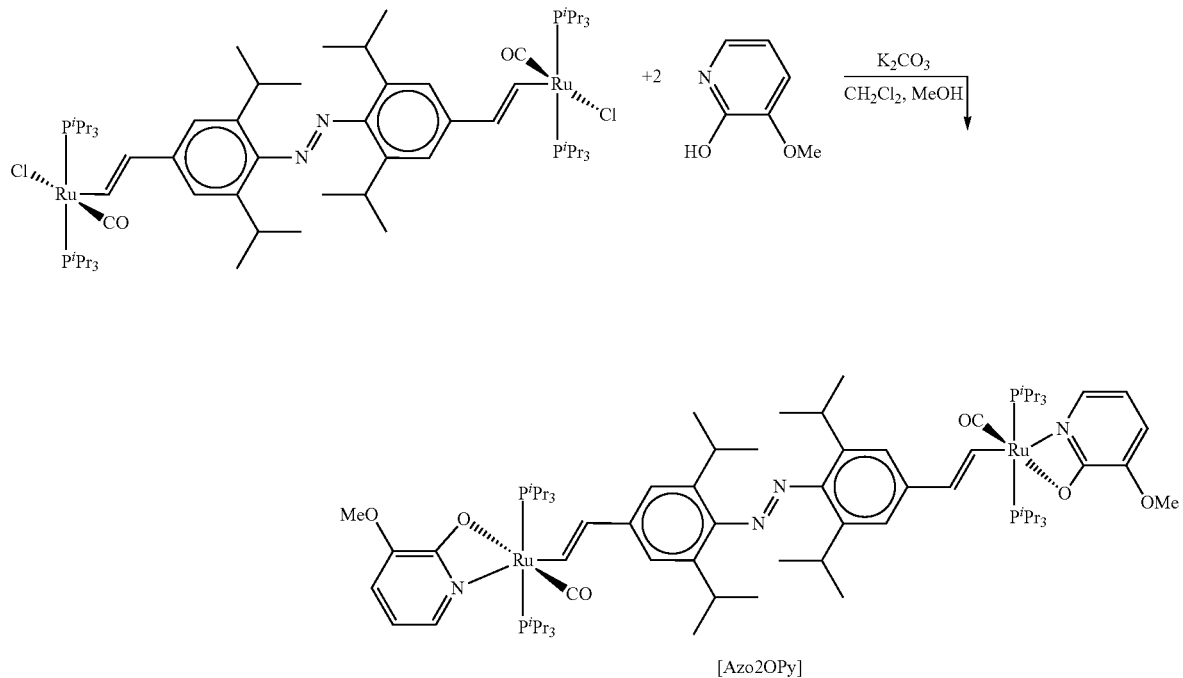

[Azo2OPy]

This six-coordinated, octahedral, bis(ruthenium-alkenyl) type-complex [Azo2OPy] was classically prepared by in high yields via substitution of the two chloro ligands of the precursor complex [{Ru(CO)Cl(P$^i$Pr$_3$)$_2$}$_2$(μ-{CH=CH—C$_6$H$_2$-($^i$Pr)$_2$-2,6}$_2$-N=N-4,4')] with the corresponding deprotonated 3-methoxypyridin-2-olate in a CH$_2$Cl$_2$/MeOH solvent mixture according to a routine protocol in a stoichiometric ratio of about 1:2. Upon addition of the solution of the deprotonated chelate 3-methoxypyridin-2-olate, the reaction solution colour changed promptly from red to deep yellow with the concomitant precipitation of KCl.

Complex [Azo2OPy] was routinely characterized in its neutral state by conventional IR, UV/Vis and NMR spectroscopy and analytical techniques, and in its two different reachable oxidized states by IR, UV/Vis/NIR spectroelectrochemistry. Our results on complex [Azo2OPy] indicate to the presence of three isomers with a ratio of 78:20:2 that differ with respect to the orientation of the two 1[N,O]$^-$-donor atoms of -methoxypyridin-2-olate relative to the CO and vinyl ligands in the equatorial plane as shown in Chart 2. $^1$H-NMR spectrum of complex [Azo2OPy] as depicted in FIG. 1 shows classical doublet at δ 9.00 ppm and doublet of triplet at δ 6.59 ppm of the four equivalent vinylic protons Ru—CH= (H$_1$) and Ru—CH=CH (H$_2$) with a large coupling constant $^3J_{H-H}$ of 13.3 Hz, respectively. This high coupling constant confirms a trans-geometry at the two vinylic double bonds. $^{31}$P-NMR spectrum of complex [Azo2OPy] as depicted in FIG. 2, likewise other ruthenium-alkenyl of similar family, shows a sharp singlet resonance at δ=35.38 ppm (major isomer) confirming that the four P$^i$Pr$_3$ ligands are chemically equivalent in which two of them are trans-disposed at each {Ru} end-groups.

The three geometrical isomers of complex [Azo2OPy] labeled as 2OTCO, 1OTCO and 2NTCO are illustrated in Scheme 3

Scheme 3

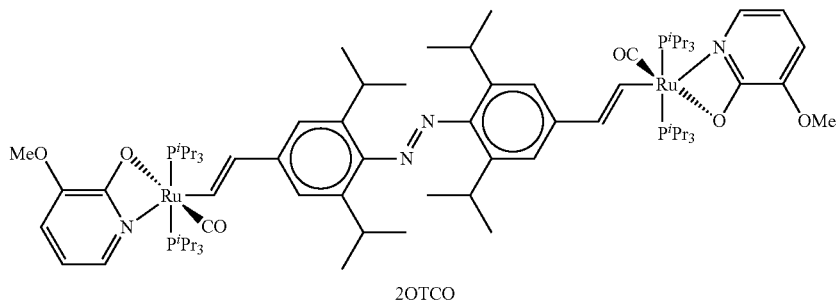

2OTCO

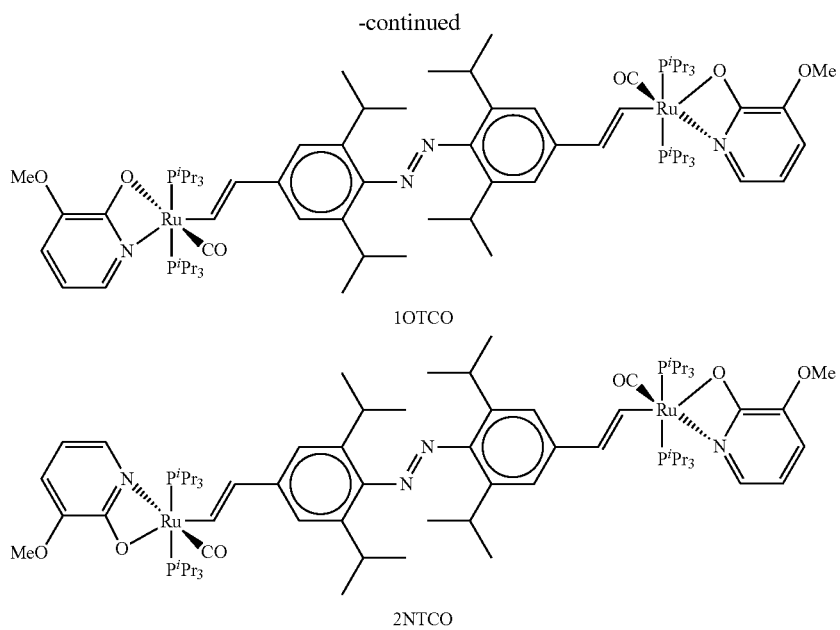

1OTCO

2NTCO

Example 4

Electrochemistry

Figures 3, 4:
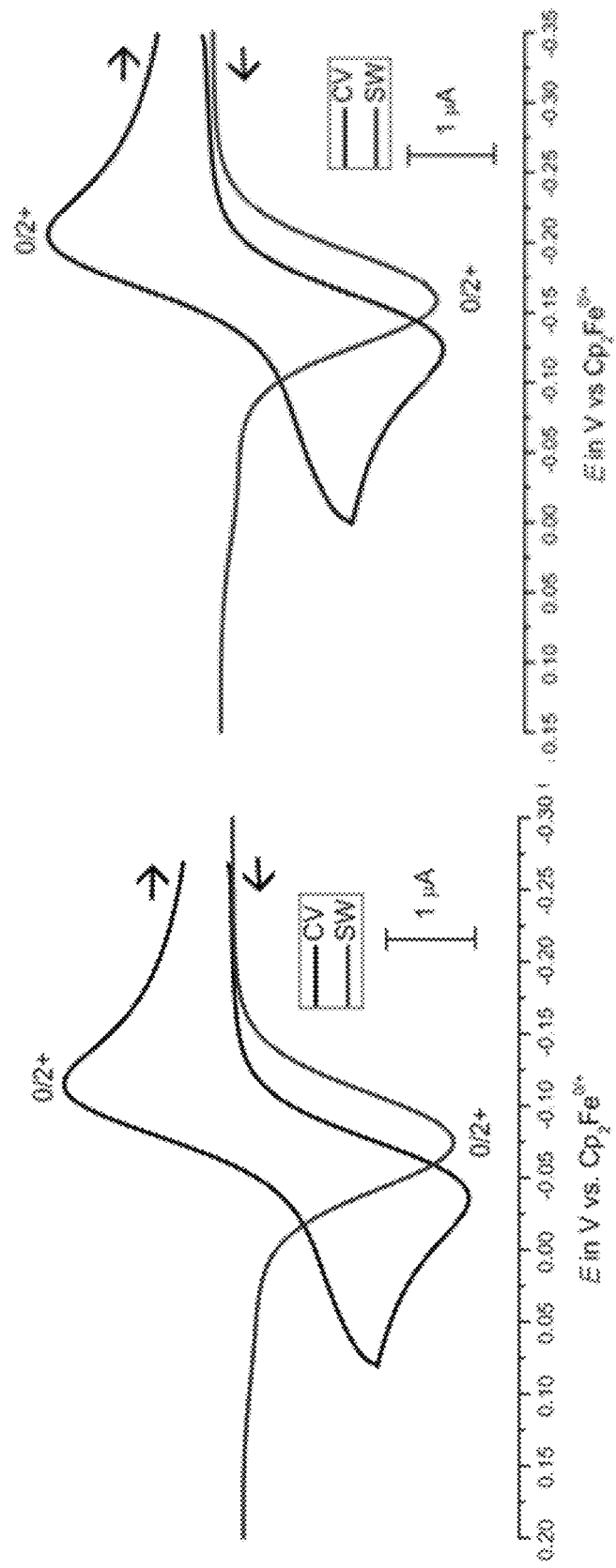
FIG. 3 shows the cyclic and square-wave voltammograms of complex [Azo2OPy] vs. Cp$_2$Fe$^{0/+}$ in CH$_2$Cl$_2$/n-NBu$_4$PF$_6$ at a scan rate v=0.1 V s$^{-1}$ or at step potential of 4 mV and a frequency of 15 Hz.
FIG. 4 shows the cyclic and square-wave voltammograms of complex [Azo2OPy] vs. NBu$_4$TFPB at a scan rate v=0.1 V s$^{-1}$ or at step potential of 4 mV and a frequency of 15 Hz.
Figure 5:
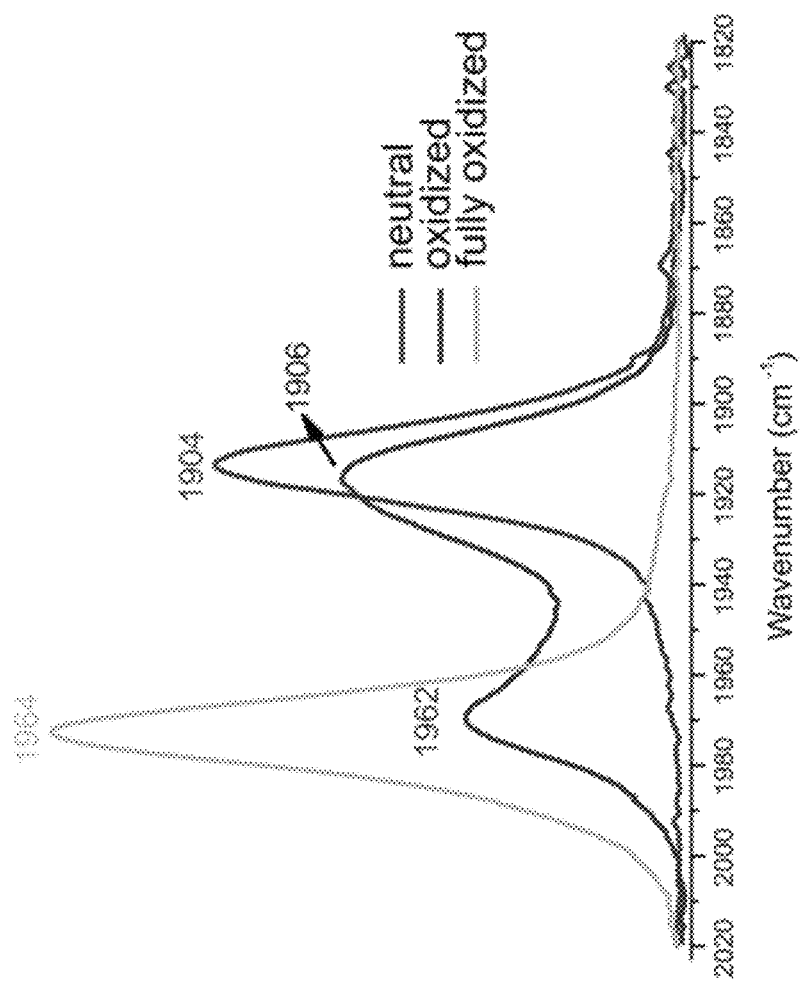
FIG. 5 shows the IR spectroscopic changes in the range of the Ru(CO) bands upon the first and the second oxidation of complex [Azo2OPy] in CH$_2$Cl$_2$/NBu$_4$PF$_6$.

The redox behavior of azoarylene-bridged bis(ruthenium-vinyl) complex [Azo2OPy] was initially scrutinized by cyclic voltammetry (CV) and square-wave voltammetry (SWV) techniques to probe the electrochemical properties and the extend of the electronic interaction (coupling) between the two ruthenium vinyl moieties. The experiments were performed in $CH_2Cl_2$/n-$NBu_4^+PF_6^-$ or $NBu_4^+TFPB^-$ TFPB$^-$=B[{($C_6H_3(CF_3)_2$-3,5}]$_4$) (0.1 M) as the supporting electrolytes. The latter electrolyte was used here because of its very weakly coordinating TFPB anion, which usually enhances the splitting of the two close redox-waves as it interacts very weakly with the positive charges generated on stepwise oxidation. FIGS. 3 and 4 shows the CV and SWV of the complex [Azo2OPy] in n-$NBu_4^+PF_6^-$ (FIG. 3) or $NBu_4^+TFPB^-$ (FIG. 4) recorded at a sweep rate of 0.1 V/s at r.t. versus the $Cp_2Fe^{0/+}$ reference couple.

Complex [Azo2OPy] undergoes a single chemically and electrochemically reversible two-electrons oxidation redox wave at −105 mV versus $Cp_2Fe^{0/+}$ in $CH_2Cl_2$/n-$NBu_4PF_6$ (left) or −165 mV versus $Cp_2Fe^{0/+}$ in $CH_2Cl_2$/$NBu_4^+TFPB^-$ (right) reference couple scale, which refers to noteworthy negligible communication between the two remote redox-active end-groups. Our attempts to separate the two redox waves was failed even by using the $NBu_4^+TFPB^-$ electrolyte.

Example 5

IR Spectroelectrochemistry

IR spectroelectrochemistry (SEC) is a quantitative and an informative tool used in this study to try to separate the two individual redox processes and to get a crucial insight into the ruthenium- versus divinylazoarylene bridge-based character of the individual redox processes. Thus can be fulfilled via investigating the changes in the energies and the band patterns for the degree of metal $d\pi/\pi^*$(CO) back-bonding upon accessible sequential oxidations, since those remarkable tokens are considered as an indicative measure of altering the electron density at the two ruthenium-vinyl moieties. Complex [Azo2OPy] in its neutral state, shows classical intense vibrational bands at around 2950, 1904, 1550, and 1530 cm$^{-1}$ assigned to C—H (aryl, vinyl), Ru(C≡O), (C=N) and (N=N) stretches, respectively. The low energy of the $\tilde{v}$(CO) stretch band reflects, however, the high electron density at the two ruthenium-alkenyl moieties.

First and second oxidations of this complex as depicted in FIG. 4 cleanly converted the neutral species to its corresponding mono- and dications in a stepwise fashion. The first radical cation of complex [Azo2OPy] led to gradually replace the neutral Ru(CO) band at around 1904 cm$^{-1}$ into a pattern of two bands; a lower-energy shoulder band with a very slight shift at 1906 cm$^{-1}$ and other higher-energy band at 1962 cm$^{-1}$. As the oxidation proceeded to the dication, the two CO bands of mixed-valent (MV) complexes [Azo2OPy]$^+$ are again blued-shifted and merged into a single band at 1964 cm$^{-1}$. This typical observation pattern confirms a weakly coupled Class I system of Robin-Day classification of MV states.

It is to be understood that the 4,4'-divinylazoarylene-bridged diruthenium catalyst bearing two Ru(CO)(3-methoxypyridin-2-olate)(P$^i$Pr$_3$)$_2$, compositions containing the same, and methods of using and producing the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A 4,4'-divinylazoarylene-bridged diruthenium catalyst bearing two Ru(CO)(3-methoxypyridin-2-olate)(P$^i$Pr$_3$)$_2$ moieties having the formula I:

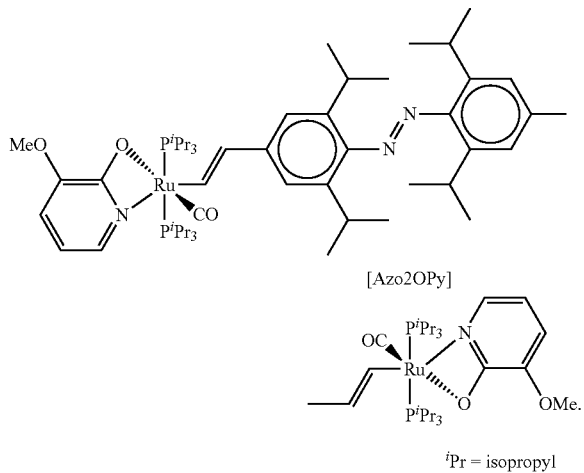

[Azo2OPy]

$^i$Pr = isopropyl

2. A method of making the 4,4'-divinylazoarylene-bridged diruthenium catalyst bearing two Ru(CO)(3-methoxypyridin-2-olate)(P$^i$Pr$_3$)$_2$ moieties of claim 1, the method comprising:
 combining 3-methoxy-2(1H)-pyridone, K$_2$CO$_3$, CH$_2$Cl$_2$, and MeOH to obtain a first reaction mixture;
 stirring the first reaction mixture for at least about 30 minutes;
 adding the first reaction mixture to a solution of [{Ru(CO)Cl(P$^i$Pr$_3$)$_2$}$_2$(µ-{CH=CH—C$_6$H$_2$-($^i$Pr)$_2$-2,6}$_2$-N=N-4,4')] in CH$_2$Cl$_2$ to obtain a second reaction mixture;
 stirring the second reaction mixture to obtain a deep yellow solution;
 removing the CH$_2$Cl$_2$ and MeOH from the second reaction mixture to obtain a yellow precipitate;
 washing the yellow precipitate to obtain a residue;
 drying the residue; and
 obtaining the 4,4'-divinylazoarylene-bridged diruthenium catalyst bearing two Ru(CO)(3-methoxypyridin-2-olate)(P$^i$Pr$_3$)$_2$ moieties.

3. The method of making the 4,4'-divinylazoarylene-bridged diruthenium catalyst bearing two Ru(CO)(3-methoxypyridin-2-olate)(P$^i$Pr$_3$)$_2$ moieties of claim 2, wherein the 3-methoxy-2(1H)-pyridone and K$_2$CO$_3$ are added in an about 1:1 molar ratio.

4. The method of making the 4,4'-divinylazoarylene-bridged diruthenium catalyst bearing two Ru(CO)(3-methoxypyridin-2-olate)(P$^i$Pr$_3$)$_2$ moieties of claim 2, wherein the second reaction mixture is stirred for at least about one hour.

5. The method of making the 4,4'-divinylazoarylene-bridged diruthenium catalyst bearing two Ru(CO)(3-methoxypyridin-2-olate)(P$^i$Pr$_3$)$_2$ moieties of claim 2, wherein the yellow precipitate is washed with n-hexane and MeOH.

6. The method of making the 4,4'-divinylazoarylene-bridged diruthenium catalyst bearing two Ru(CO)(3-methoxypyridin-2-olate)(P$^i$Pr$_3$)$_2$ moieties of claim 2, wherein the yellow precipitate is washed twice.

7. The method of making 4,4'-divinylazoarylene-bridged diruthenium catalyst bearing two Ru(CO)(3-methoxypyridin-2-olate)(P$^i$Pr$_3$)$_2$ moieties of claim 2, wherein the yellow precipitate is dried in vacuo.

8. The method of making the 4,4'-divinylazoarylene-bridged diruthenium catalyst bearing two Ru(CO)(3-methoxypyridin-2-olate)(P$^i$Pr$_3$)$_2$ moieties of claim 2, wherein the [{Ru(CO)(3-methoxypyridin-2-olate)(P$^i$Pr$_3$)$_2$}$_2$(µ-{CH=CH—C$_6$H$_2$-($^i$Pr)$_2$-2,6}$_2$-N=N-4,4')], 3-methoxy-2(1H)-pyridone, and K$_2$CO$_3$ are added in an about 0.3:1.1:1.1 molar ratio.

9. The method of making the 4,4'-divinylazoarylene-bridged diruthenium catalyst bearing two Ru(CO)(3-methoxypyridin-2-olate)(P$^i$Pr$_3$)$_2$ of claim 2, wherein the 4,4'-divinylazoarylene-bridged diruthenium catalyst bearing two Ru(CO)(3-methoxypyridin-2-olate)(P$^i$Pr$_3$)$_2$ moieties compound is obtained in an about 93% yield.

\* \* \* \* \*